US011677816B2

(12) United States Patent
Seibel et al.

(10) Patent No.: US 11,677,816 B2
(45) Date of Patent: *Jun. 13, 2023

(54) N-TIER WORKLOAD AND DATA PLACEMENT AND ORCHESTRATION

(71) Applicant: EMC IP Holding Company LLC, Hopkinton, MA (US)

(72) Inventors: Amy N. Seibel, Cambridge, MA (US); Kathleen Moriarty, Arlington, MA (US); Megan Murawski, Belmont, MA (US); Victor Fong, Medford, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/339,450

(22) Filed: Jun. 4, 2021

(65) Prior Publication Data
US 2021/0306408 A1 Sep. 30, 2021

Related U.S. Application Data

(63) Continuation of application No. 16/836,093, filed on Mar. 31, 2020, now Pat. No. 11,089,092.

(51) Int. Cl.
H04L 67/101 (2022.01)
H04L 67/1097 (2022.01)
H04L 47/25 (2022.01)
H04L 9/40 (2022.01)
H04L 43/0882 (2022.01)
H04L 69/22 (2022.01)
H04L 43/0805 (2022.01)
H04L 41/0816 (2022.01)
H04L 43/0817 (2022.01)
H04L 67/60 (2022.01)

(52) U.S. Cl.
CPC ........ H04L 67/101 (2013.01); H04L 41/0816 (2013.01); H04L 43/0805 (2013.01); H04L 43/0817 (2013.01); H04L 43/0882 (2013.01); H04L 47/25 (2013.01); H04L 63/20 (2013.01); H04L 67/1097 (2013.01); H04L 67/60 (2022.05); H04L 69/22 (2013.01)

(58) Field of Classification Search
CPC ............... H04L 67/101; H04L 43/0805; H04L 43/0882; H04L 47/25; H04L 63/20; H04L 67/1097; H04L 69/22
See application file for complete search history.

(56) References Cited

U.S. PATENT DOCUMENTS 9,621,428 B1* 4/2017 Lev .................. H04L 41/12
10,476,745 B1 11/2019 McCormick et al.
11,012,872 B1* 5/2021 Bellamkonda ........ H04W 24/02
(Continued)

Primary Examiner — Viet D Vu
(74) Attorney, Agent, or Firm — Workman Nydegger

(57) ABSTRACT

One example method includes creating a manifest that specifies one or more requirements concerning execution of an application that resides at an end device in an N-tier configuration, identifying a workload that is associated with the application and executable at one or more edge stations of the N-tier configuration, gathering and evaluating network telemetry, orchestrating the workload based on the network telemetry and the manifest, scheduling performance of the workload at the one or more edge stations, and performing the workload at the one or more edge stations in accordance with the scheduling.

16 Claims, 5 Drawing Sheets

(56) References Cited

U.S. PATENT DOCUMENTS

| | | |
|---|---|---|
| 2017/0366616 A1* | 12/2017 | Rodrigues Nascimento ............... H04W 4/44 |
| 2018/0027100 A1 | 1/2018 | Jeuk et al. |
| 2019/0138934 A1* | 5/2019 | Prakash ................... H04L 43/08 |
| 2019/0180272 A1 | 6/2019 | Douglas |
| 2019/0377900 A1 | 12/2019 | Balzer et al. |
| 2020/0007414 A1 | 1/2020 | Smith et al. |
| 2020/0059468 A1 | 2/2020 | Wolosewicz |
| 2020/0136994 A1* | 4/2020 | Doshi ..................... H04L 67/12 |
| 2020/0167205 A1 | 5/2020 | Guim et al. |

* cited by examiner

N-TIER WORKLOAD AND DATA PLACEMENT AND ORCHESTRATION

FIELD OF THE INVENTION

Embodiments of the present invention generally relate to edge computing. More particularly, at least some embodiments of the invention relate to systems, hardware, software, computer-readable media, and methods for N-tier workload and data placement and orchestration.

BACKGROUND

Edge-computing is bringing computation closer to users with reduced network latency. Although a 3-tier edge design, such as datacenter-edge-end-device, is known, this configuration may not be well suited for many use cases. Moreover, there is no common platform for developers to implement effective alternatives without a significant amount of engineering and infrastructural effort.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
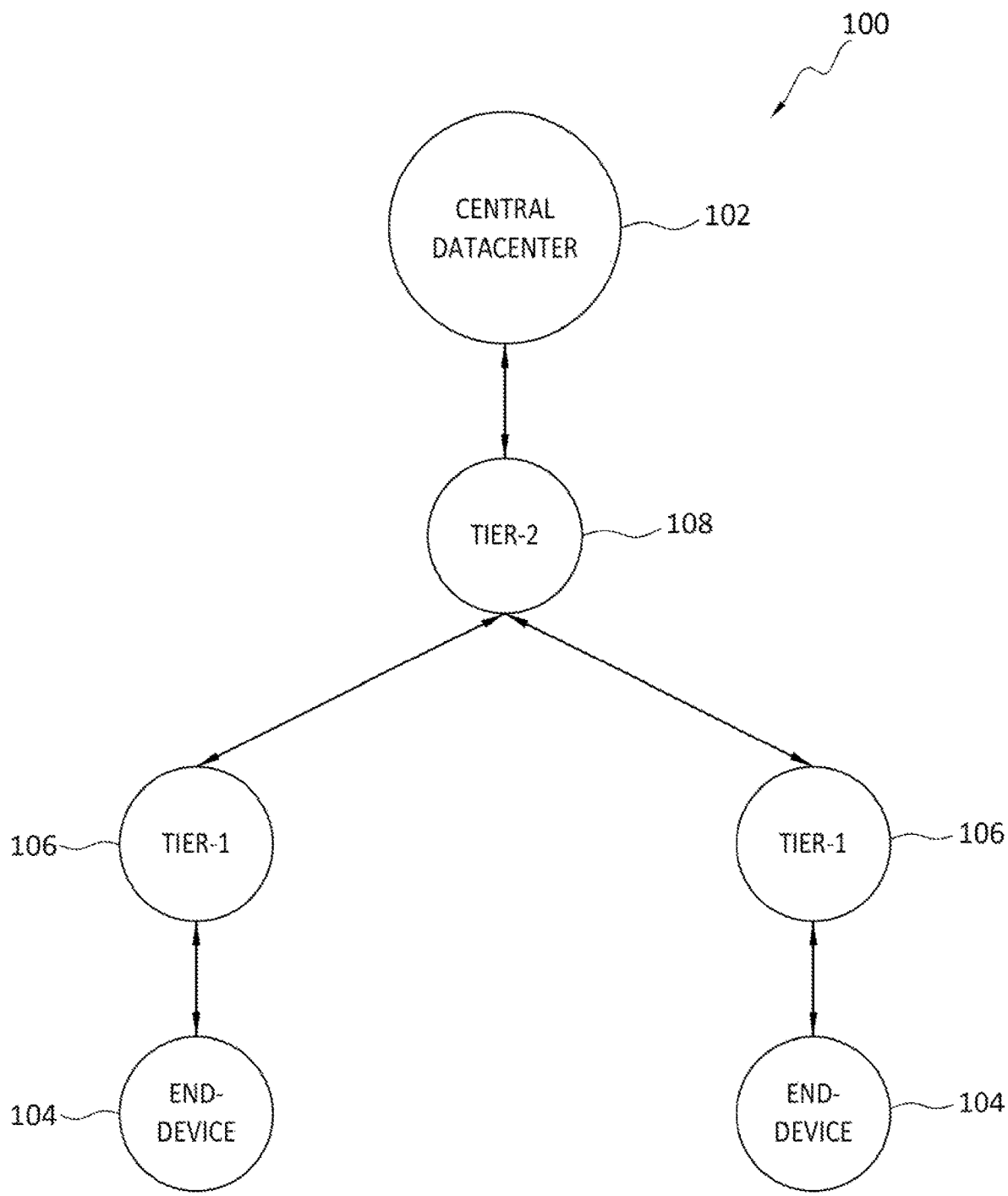
FIG. 1 discloses aspects of an example N-tier configuration.

Embodiments of the present invention generally relate to edge computing. More particularly, at least some embodiments of the invention relate to systems, hardware, software, computer-readable media, and methods for N-tier workload and data placement and orchestration.

At least some example embodiments implement an N-tier edge design, such as central datacenter—N edge station hops—end-device, so that workloads can be placed across a topology of edge stations based on network performance to improve user experience. For example, some embodiments involve the creation and use of an edge-platform that can dynamically orchestrate workloads and data across an edge station topology with a developer-defined manifest, so that placement can be optimized based on network performance across an edge station topology. Such embodiments may also enable users and administrators to opt in, or out, of having their network telemetry data included in the dynamic orchestration process. As well, various embodiments of the invention may enable expansion of the orchestration across multiple cloud/infrastructure providers.

As used herein, telemetry, or telemetry data, embraces, but is not limited to, any data/metadata communicated to/from an end device of a user, as well as any data and metadata about such communications. Telemetry and telemetry data further include any data/metadata concerning that user and/or end device, whether or not such data/metadata is transmitted to, or originates from, that user and/or end device. As well, telemetry data may include any data/metadata that comprises, or consists of, PII. Telemetry data may be affirmatively provided to one or more entities by a user and/or an end device of the user. Additionally or alternatively, telemetry data may be gathered by way of taps or other collection devices on communication paths employed by an end device. Telemetry data may be transmitted between/among any of the disclosed computing devices and entities. As well, telemetry data may be collected and/or processed by any of the disclosed computing devices and entities.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

For example, one advantageous aspect of at least some embodiments of the invention is that they may enable developers to specify the startup strategy of workloads that would be orchestrated across N-tiers, where N≥0, so that the developers can pick the best strategy to maximize user experience. An embodiment of the invention may enable developers to specify the network requirement and network weights, so that developers can have control over how the workloads would be deployed across N-tiers to ensure a satisfactory and effective user experience. One embodiment of the invention may enable a developer to specify hardware requirements and execution environment for each of the N tiers, so that hardware consumption and associated costs can be optimized by the scheduler. In an embodiment, optimal container and data placement across N tiers according to IPv6 headers and flow labels may be realized. Particularly, based on the developer-specified manifest and network telemetry, a weighted shortest-path algorithm is used in embodiments of the invention to orchestrate workloads across N-tiers and data to co-locate with the workloads. One embodiment provides for a scheduler that may determine the optimal deployment plan, and the scheduler may connect with the orchestrator installed in each of the edge stations, so that the container and data can be orchestrated to container orchestration stack installed on each edge station. An embodiment may provide for opt-in functionality to enable endpoint administrators to control participation in a dynamic orchestration process. One embodiment may provide for intrinsic protection of user measurement data, including personally identifiable information (PII) when stored and accessed across n tiers, and/or when members of the public volunteer their systems. As a final example of advantageous aspects of one or more embodiments, one embodiment may enable opt-in preferences to be shared among a designated set of endpoint devices and stations based on an identity, shared profile, workload configuration that may be container-specific, or a user profile that may be migrated between multiple endpoint devices or stations.

A. Overview

Following is a discussion of considerations that may provide some context for, and fuller appreciation of, various aspects of example embodiments of the invention. Such considerations are introduced by way of reference to the example use case disclosed in FIG. 1. Depending on the location of end-devices, the placement of workloads may need to be dynamically chosen to optimize on network speed. Using the central datacenter as the only hub to aggregate and maintain data and state may negatively impact the user experience, if the end-devices have low network speed to the central datacenter.

Attention is directed now to the example of FIG. 1 which discloses aspects of an example scenario of a 2-player real-time racing game, which enables two players to compete on real-time racing over the Internet. In the example configuration 100 of FIG. 1, a central datacenter 102, or other hub, is included that may operate to aggregate and maintain data and state of multiple end devices 104, which may also be referred to herein as edge devices, and may also operate to carry out processing workloads associated with the end devices.

In this example, a respective Tier-1 edge station 106 may be installed at the respective locations of the players so that the Tier-1 edge station 106 can provide computational resource to reduce stress from the end-devices 104. A Tier-2 edge station 108 may be provided as a communication hub to consolidate data and actions streamed from both players, using the end devices 104, to the central datacenter 102. To illustrate, the Tier-2 edge station 108 may evaluate data and actions received from the end devices 104 to determine whether or not the two racecars have crashed into each other. Note that while it may be possible for both Tier-1 edge stations 106 to connect directly to the central datacenter 102 by bypassing the Tier-2 edge station 108, network latency from the locations of the Tier-1 edge stations 106 to the central datacenter 102 may degrade the user experience, while also reducing the benefit of utilizing edge computing and devices. One optimization may be to introduce still another tier via an edge station, with equal network connection speed between the two players. Such a placement of higher tier edge stations may also ensure that no player can gain unfair advantage due to network latency such as, for example, if one of the players is close to the central datacenter 102, while the other is far away from the central datacenter 102.

The example configuration 100 disclosed in FIG. 1 illustrates aspects of the general notion of an N-tier configuration using the specific example of a 4-tier edge design. It should be understood that the general concepts disclosed in FIG. 1 may be extended to any number of tiers, that is N-tiers, based on the particular use case and other considerations involved, such as the number of end-devices to be employed.

B. Technical Considerations Relating to Some Embodiments

In order to implement, and realize the benefits of, embodiments of the invention such as the example N-tier configuration 100 disclosed in FIG. 1, there are a number of challenges that may need to be addressed, at least in some circumstances. These challenges, discussed briefly below, may be resolved by one or more embodiments of the invention.

One challenge that may be addressed by embodiments of the invention concerns orchestration of workload, and data, across N-tiers. Currently, there is no well-defined methodology and infrastructure for DevOps engineers to orchestrate workloads and data across N-tiers of edge stations. Thus, the DevOps engineers would have to deploy the workload and data on each of the individual edge stations. However, given that edge stations may have limited computational and storage capability compared to a large datacenter, this approach to orchestration would not be efficient. Furthermore, as the number of edge stations in a particular computing environment scales in numbers, such as one edge station per town for example, the cost for having these workloads and data to be always active on each edge station may be high. A related challenge is that in order to realize effectiveness and efficiencies, workload and data need to be placed dynamically based on real-time network speed. Placement choices should to be made according to an edge station topology. Currently however, there is no platform capable of implementing these functions.

Another challenge concerns developer-defined weights for network connection. Particularly, based on considerations such as application design, each network connection may have a different importance relative to one or more other network connections. Thus, workload and data placement decisions may have a need to consider these weights so that placement can be optimized. To illustrate with reference to the example of FIG. 1, the network speed between the end-devices 104 and Tier-1 edge stations 106 may be important, as the end-device 104 computation may need to be offloaded to the Tier-1 edge station 106. Further, the network connection between Tier-1 end-devices 104 and Tier-2 edge station 108 may be important as well, since the Tier-2 edge station 108 may be responsible to make real-time decisions such as concerning the locations of each racecar in the example of FIG. 1. Note that, in the example of FIG. 1 at least, the connection between the Tier-2 edge station 108 and the central datacenter 102 may not however, be as important. In this illustrative use case, the central datacenter 102 may just be keeping track of the result, but not doing any real-time computation and/or communication.

Further challenges that may be addressed by one or more embodiments of the invention generally concern a software development pattern and platform for N-tier edge configuration design. More specifically, there is currently no well-defined methodology and standard for developers to design and implement an application configured to operate in connection with an N-tier edge design. The following examples are illustrative.

For example, there may be a need to access network telemetry data from existing sessions, as the use of strong transport encryption protocols increases. Particularly, it may become harder to gain access to network telemetry data to inform workload placement, as use of encrypted protocols increases. This may be important when re-provisioning, or other similar scenarios where existing session data is used to gather metrics. Alternative options, such as pinging, may not be permitted due to network policy restrictions.

As another example, user privacy may need to be protected as user data moves through a dynamic orchestration process. For example, private user data, such as session information for example, may need to be protected as network telemetry data is not only gathered, but as that telemetry data is stored and used for orchestration purposes.

Moreover, consideration may need to be given to transfer of opt-in policies to edge stations when workloads are migrated from one or more edge stations to one or more other edge stations. For example, there may be circumstances where a user or administrator has opted into, or out of, additional network traffic monitoring on an edge station or end point device, a user profile, a system profile, or workload configuration. However, when the user workload is migrated to one or more other edge stations, those edge stations may not necessarily be aware of the opt-in policies of that user.

A final challenge concerns obtaining network telemetry across multiple domains. Particularly, it may be difficult to obtain network telemetry across multiple network administrative domains, especially when encryption is being used for data and/or communications.

C. Aspects of an Example Architecture and Environment

The following is a discussion of aspects of example operating environments for various embodiments of the invention. This discussion is not intended to limit the scope of the invention, or the applicability of the embodiments, in any way.

Embodiments of the invention may be directed to any environment in which processes such as, for example, data generation and modification, workload migration, workload performance including computing operations, and data storage, are, or may be, performed. New and/or modified data collected and/or generated in connection with some embodiments, may be stored in a data protection environment, such as a datacenter for example, that may take the form of a public, or private, cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 2:
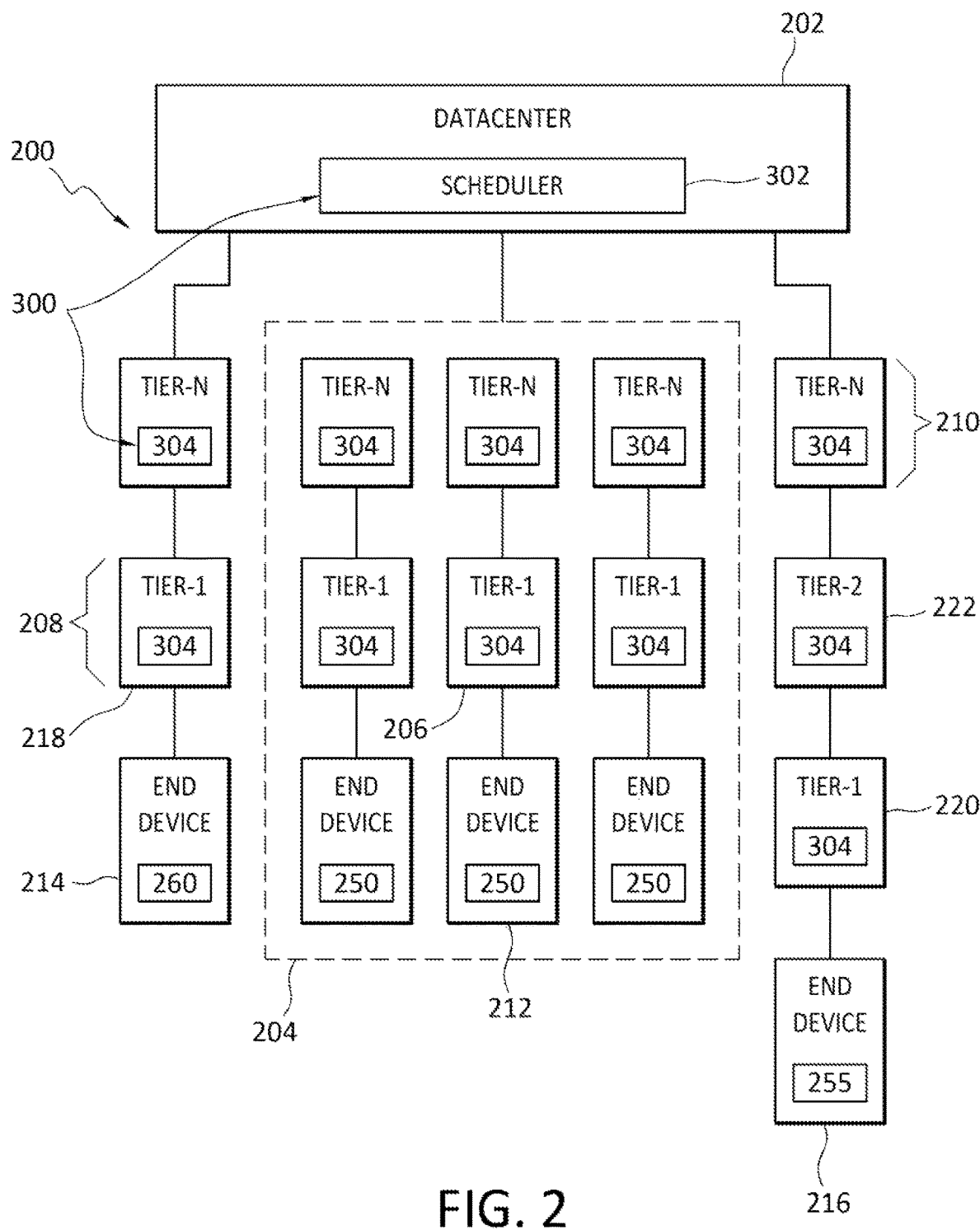
FIG. 2 discloses aspects of another example N-tier configuration.

With particular attention now to FIG. 2, one example of an operating environment for embodiments of the invention is denoted generally at 200. In general, the operating environment 200 may embrace any N-tier configuration, examples of which are disclosed herein. The operating environment 200 may comprise, or consist of, a computing network such as a LAN, or WAN such as the Internet, for example.

In the particular example of FIG. 2, the operating environment 200 may comprise a workload and data orchestration (WDO) platform 300 that comprises a scheduler 302 and an orchestrator 304. The scheduler 302 may reside, for example, at a datacenter 202 and/or other central entity, and the orchestrator 304 may be associated with a cluster 204 that comprises a grouping, which may be ad hoc, of edge stations 206. In some embodiments, a respective instance of the orchestrator 304 may reside on each of the edge stations 206.

The edge stations 206 may collectively define, either in part or in whole, a corresponding tier 208 that may communicate with, and/or by way of, one or more additional tiers 210. Communications passing through the tier 210 may flow directly to/from the datacenter 202 and/or one or more tiers. Each of the edge stations 206 may communicate with one or more end devices 212, such as by way of one or more tiers for example. As further indicated in FIG. 2, some end devices, such as end devices 214 and 216, may not be part of the cluster 204. As well, some edge stations, such as edge stations 218, 220, and 222 may not be part of the tier 208. Further, the scheduler 302 and orchestrator 304 may communicate with each other, as well as with any tier, edge station, and end device. Finally, one or more instances of an application 250 may be provided at one or more of the end devices 212 and that, in operation, may employ data storage and/or processing capabilities of one or more of the tiers and associated edge stations.

It is noted that attributes of a tier topology, such as the size, number, and geographic distribution of tiers, may be defined on one or more bases. For example, a set of tiers may have geographic basis such that the group of tiers comprises a tier corresponding to each of the following: city; region; and, national. As another example, one or more tiers may be defined on the basis of a distance between a central point, such as a datacenter, and one or more end devices, such that a relatively longer distance implied more tiers, while a relatively shorter distance may imply fewer tiers. A tier may also be limited to a particular minimum/maximum number of edge stations. The number of tiers employed may be a function of the actual or expected latency between a central point, such as a datacenter, and one or more end devices. As a final example, a tier topology may be based on the aggregate data storage and/or processing power needed for an application or group of applications. More generally, a tier topology, including the size of a tier and the number of tiers employed, may be generated based on a variety of different considerations.

D. Aspects of Some Example Embodiments

D.1 General

In general, and with reference to the example embodiments of FIG. 1 and FIG. 2, example embodiments of the invention may provide a workload and data orchestration platform to enable the N-tier edge design. Such embodiments may optimize workload and data placement based on developer-defined manifest and real-time network telemetry. Furthermore, embodiments of the invention may continuously monitor network telemetry, so that workloads can be migrated to a more optimal edge station when network performance characteristics and measurements change. There may be an option for administrators of endpoint devices and/or edge stations to opt in, or out, of this monitoring. Telemetry from opted-in users may be used in the determination of workload and data placement. As well, embodiments of the invention embrace the use of data from opted-in users in the workload and data placement process, and may employ opt-in functionality to include consent to the use of captured data in workload and data placement. Embodiments of the invention may also involve management and implementation of the migration of workloads from one device to another. Further, embodiments of the invention may enable an administrator of an end device or edge station to opt in, or out of, participation in an underlying data collection process. Also, in some cases, the network telemetry data being used for orchestration may come from users, such as end device users, who have opted in to monitoring on the endpoint, that is, at the end device of the user.

In some embodiments, a user with the correct permissions may be able to opt in to telemetry monitoring on behalf of one or more other users. Such monitoring may take the form, for example, of IPv6 packet header monitoring, although that is not necessarily required, and alternative forms of monitoring may be employed. Further, in some embodiments, where a user or administrator has opted in to monitoring, the user or administrator may also choose to terminate monitoring at a point in time designated by the user or administrator.

D.2 Scheduler and Orchestrator

As noted, example embodiments of the invention may comprise a scheduler and an orchestrator, examples of which are disclosed in FIG. 2. As indicated in FIG. 2, an instance of an orchestrator may be installed on each cluster of edge stations, and the scheduler may be installed at a central location, although no particular location is required for either of the orchestrator or the scheduler. Opt-in could be handled via the orchestrator through the use of manifests, or by way of an opt-in process, for example. The scheduler may be aware of the presence and logical distance of each edge station that forms part of a topology of edge stations. The scheduler and/or other entities may perform a discovery of each edge station and the forming of the topology that comprises the discovered edge stations. Any suitable process for discovering nodes, such as edge stations, across a network, such as the Internet, may be employed, examples of which include manual configuration, use of a central repository that contains a listing of nodes, or broadcasting pings or other signals over a network to discover nodes.

As noted earlier, embodiments of the invention may provide for an application development process that takes into account the structure and operation of an N-tier configuration such as is disclosed herein. Thus, at development time, application developers may create a manifest, which may be application-specific, that specifies the workload and data that would, or may, be orchestrated to each tier of edge stations in connection with the operation of the application. The manifest may be employed by the scheduler and the orchestrator in the management of workload and data storage in the N-tier environment.

Such a manifest may specify, for example, the following information for each tier that may be involved with application operations: data orchestration information; container execution information including a container image, and runtime environment variables; hardware requirements, such as RAM/CPU/GPU requirements; and, network requirements such as network weight, and a minimum acceptable network speed. Depending on the implementation, additional or alternative information may be included in the manifest. More generally, any information may be included in the manifest that may enable the scheduler and orchestrator to perform operations such as optimizing the placement of workload and/or storage of data.

Embodiments of the invention may also enable a developer, operating at a datacenter, development site, enterprise site, and/or elsewhere, to replicate a particular container, or group of containers, across multiple tiers, even where the particular number of tiers for which a container may be replicated is not specified. The number of tiers across which a container is to be replicated may have a default value, such as one tier for example, that may be modified by a developer. Where replication is expected, or needed, the developer may specify in the manifest the minimum and maximum number of tiers over which a given container may be replicate such as, for example, in data aggregation and inference use cases.

Depending upon the embodiment, replication may simply cease once the minimum and/or maximum thresholds for the number of container instances that may be deployed are met. Such thresholds may be developer-defined, but that is not necessarily required. In other embodiments, if the threshold(s) are not, or cannot, be met, replication may not be performed at all, or may be delayed until such time as it becomes apparent that the thresholds can be met. Note that as used herein, a 'container' embraces, but is not limited to, a self-contained environment that runs an application, or applications. One example of a container is a Docker container, although the scope of the invention is not limited to any particular container type, nor to the use of containers. Finally, the manifest may be uploaded to the scheduler, and the container images may be uploaded to a container repository at a datacenter, and/or elsewhere.

Figure 3:
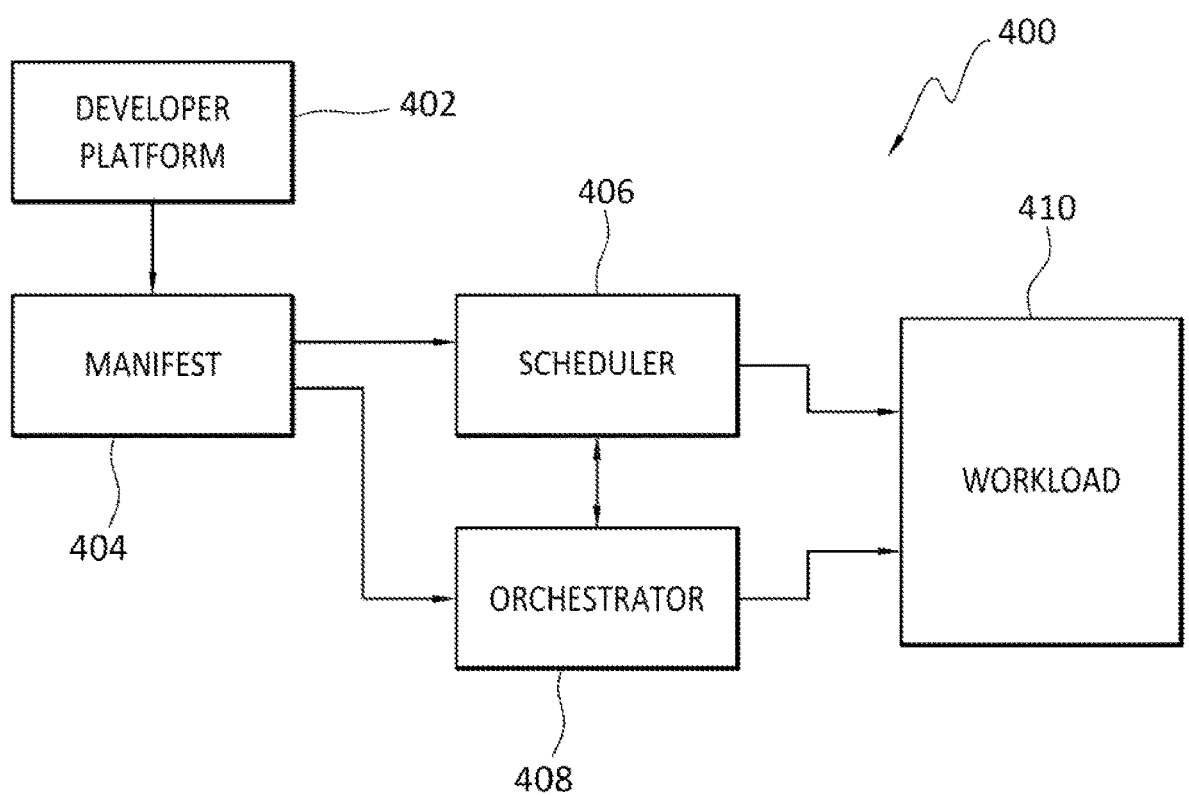
FIG. 3 discloses aspects of an example configuration for creating and distributing a manifest.

With reference now to FIG. 3, further details are provided concerning a configuration 400. As indicated, the configuration 400 may include a developer platform 402, which may be located at a central location such as a datacenter, and/or elsewhere. The developer platform 402 may enable a developer to generate a manifest 404, examples of which are disclosed elsewhere herein. The manifest 404 may be provided to a scheduler 406 and/or orchestrator 408. Additionally, or alternatively, the manifest 404 may be provided by one of the scheduler 406 and orchestrator 408 to the other of the scheduler 406 and the orchestrator 408. As noted herein, in some embodiments, the manifest 404 may also be attached or otherwise associated with a workload 410 so that the manifest 404 travels with the workload 410.

D.3 Runtime Considerations

At runtime for the application, the network speed of each connection between edge stations may be measured continuously, or on some other basis, by a pre-configured time interval, such as about 1 minute for example. The mechanism to capture round-trip-delays between edge stations may vary based on the infrastructure and implementation. One approach may be used for connections over the Internet where IPv6 is deployed, as such an approach may not limit the measurement to a single administrative domain as would routing overlay protocols. IPv6 may be important when encryption protocols for real-time streaming protocols like QUIC are in use. Network speed measurements may be taken on existing transport sessions using an IPv6 Destination Option Header extension monitoring process. As such, this approach may provide an advantage in terms of the ability to continually sample measurements that may be analyzed, such as by graph analysis or trend analysis for example, to determine if it may be advantageous to re-provision the session at any given time.

Note that IPv6, or Internet Protocol version 6, refers to a version of the Internet Protocol (a communications protocol) that sets forth an identification and location system for computing entities on networks. IPv6 also may be employed to route traffic on computing networks, such as the Internet.

When a trigger is initiated by an application, such as a video game application of an end device in the example of FIG. 1, and received by the scheduler, such as when a game needs to be scheduled, or rescheduled, the applications installed at the end-devices may be added to the topology first in an attempt to select the tier-1 edge stations. Various methods may be used to determine an optimal tier-1 edge station for the end device to connect to. For example, the end device may initiate multiple sessions simultaneously to several logically and topographically "close" Tier-1 edge stations, as determined by continually updated logical/topographical maps for example, using a graph theory approach in which the topology of one or more tiers may be displayed or otherwise rendered in the form of a map. The initiated session that is first to respond may be selected by the end device as the preferred Tier-1 edge station, or measurements taken using an opt-in IPv6 destination option header extensions may aid in the selection process. In a situation where one or more of the Tier-1 edge stations are privately owned, such as in the case of a home edge station for example, the Tier-1 selection may be implemented manually based on user preference.

Depending upon the hardware requirements specified in the application manifest, unqualified edge stations may be dropped from the topology. Also based on the minimum network speed specified in the application manifest, unqualified network connection would be removed from the topology. That is, a tier topology may comprise, or consist of, only those edge stations that meet the application requirements specified in the manifest. After the topology has been defined for a use case, such as in the aforementioned example, a weighted shortest-path algorithm, or other suitable process, may be used to determine the best placement, on one or more tiers of the N-tier structure, of the application workload. Once the scheduler determines the orchestration plan, using the defined topology of the tier(s), workload and data associated with the application on the end device may then be orchestrated to each of the edge stations by the orchestrator.

In some embodiments, the orchestrator may invoke a container and data orchestration stack. Given that different container and data orchestration stacks are available, an adopter design model may be employed so that the orchestrator may utilize multiple types of common stacks. Each container image for an application workload may be transmitted over to the edge stations along with the associated application data. A mechanism to warm-restore a container may be used to speed up the container start-up time, but that is not required.

While starting the container(s) at each tier, the route or address, such as a URL/IP/Port for example, of each tier may be created by the container orchestration stack and injected into the containers on the tiers directly connected. To illustrate, Tier-2 would need to know the routes of Tier-1 and Tier-3. Depending on the implementation of applications, the container startup order may be sequential. For example, to optimize a user experience, the containers may be started in sequence from Tier-1 to Tier-N, where Tier-1 is closest to the end device, and Tier-N the most distant, whether geographically or in terms of latency for example, of the tiers from the end device, so that each tier may continue to connect to the central datacenter until the next tier is available. When the next tier is available, the current tier can simply modify the route to connect to the next tier instead of directly to the central datacenter. In one alternative approach, all tiers may start in parallel and the application may wait until all containers are confirmed to be online before proceeding, that is, before running on the end device.

At runtime, embodiments of the invention may continue to monitor the network telemetry captured, so that if one of the network connections has fallen below the minimum acceptable network performance metrics, as specified in a manifest for example, a rescheduling process may be triggered. The scheduler may then re-execute the weighted shortest-path algorithm in an attempt to find a better orchestration model. If a better orchestration model can be found, the scheduler may notify the orchestrator to migrate the application workload and/or application data to one or more new, that is, different, edge stations.

Depending on whether a workload is stateful or stateless, different workload migration mechanisms may be used to minimize workload migration time between edge stations. For stateless workloads, starting a new container at the new edge station(s) may be sufficient. The new container may be fully functional before the orchestrators of other tiers flip or modify the network route to reflect that the new edge stations will take on the workload that is being migrated, and to eliminate any references to routes involving the old edge station(s) from which the workload has been, or will be, migrated. At this time, the old container, that is, the container on the edge station from which the workload is being migrated, may be terminated. For stateful workloads, some downtime of the application may occur as the workloads are migrated.

Finally, when the application is finished generating workloads, such as when a video game at one or more end devices completes, the application may automatically notify the scheduler. The scheduler may then notify all the orchestrators to terminate the workload and remove the application data from the edge stations. The containers may likewise be removed from any edge station(s) where they reside. In some embodiments, the containers may be cached.

E. Further Discussion of Some Example Features

As noted, embodiments of the invention may implement a variety of useful aspects and features, examples of which are addressed in the following discussion. None of such aspects or features are required to be included in any embodiment, nor is the scope of the invention limited to such aspects and features.

One useful aspect of example embodiments concerns the developer-defined startup strategy. Particularly, such example embodiments may empower developers to specify the startup strategy of workloads that will be orchestrated across N-tiers, so that the developers can pick the best strategy to maximize user experience. Choices available to developers may include, with respect to container and/or tier startup, sequential and wait-for-all approaches. Based on the implementation, additional complexity may be added, such as a tier-based strategy to best address different use cases. For example, in one hypothetical configuration, Tier-1 and Tier-2 may start in parallel, while Tier-3 and Tier-4 may be started sequentially.

As another example, embodiments of the invention may provide for developer-defined network connection weights and network requirements. Particularly, some embodiments may enable developers to specify the network requirement and network weights, so that developers can have control over how the workloads would be deployed across N-tiers to ensure a desired user experience.

Embodiments of the invention may also provide for developer-defined hardware requirement for N-tiers. For example, the developer of an application may specify application-specific requirements, such as hardware requirement and execution environment for each of the tiers, so that hardware usage, and consumption of bandwidth and other resources may be optimized by the scheduler. Moreover, such optimization may result in a cost reduction relative to the cost that would be incurred where one or more of these optimizations is not implemented.

Yet another useful aspect of some embodiments of the invention concerns the functionality which enables optimal container and data placement across N-tiers according to IPv6 extension headers and flow label. Based on the developer-specified manifest and network telemetry, a weighted shortest-path algorithm may be employed in some embodiments to orchestrate workloads across N-tiers and data to co-locate with the workloads. Alternatively, graph theory or other methods may be used to facilitate optimized container and data placement across N-tiers.

Note that as used herein, a flow refers to a sequence of packets may be sent form a source to one or more particular destinations. The flow label may be used, such as by the source, to label packets that require particular handling by IPv6 routers and/or by the destination(s).

Embodiments of the invention may provide for container and data orchestration across N-tiers. For example, once the scheduler determines an optimal deployment plan, the scheduler may connect with the orchestrator installed in each of the edge stations, so that the container and data can be orchestrated to a container orchestration stack installed on each edge station.

As another example, embodiments of the invention may employ opt-in technology to enable administrators to control participation in the dynamic orchestration process. Particularly, such embodiments may employ application of opt-in technology, including adding metadata to existing transport sessions using IPv6, in provisioning and re-provisioning use cases, to optimize performance. Troubleshooting processes other than re-provisioning may additionally, or alternatively, be employed.

Still another useful aspect of some embodiments concerns the intrinsic protection of user measurement data, including personally identifiable information (PII) when stored and accessed across N tiers, and/or when members of the public volunteer their systems for use as edge stations. For example, measurements of network speed and/or other network performance parameters in connection with the performance of a user application may be taken as samples on a scheduled or as-needed periodic basis to update the graph analysis and logical topographic map used to determine optimal provision and re-provisioning of edge-devices to Tier-1 servers as well as to Tier-n. A balance may be struck between the need for privacy of the user telemetry with the need for reliable network performance information that may be used to improve the end user experience. For example, telemetry data may be processed in such a way, such as by various forms of encryption, as to conceal the identity of the user, while still revealing performance information. This may be implemented across one, or all, tiers of a configuration. As well, provision may be made for deletion, which may be automatic, of user telemetry at a specified time, such as after a workload is moved, or an application has finished running.

A final example of useful aspects of some embodiments is that such embodiments may allow for sharing of opt-in preferences among a designated set of endpoint devices and stations. Particularly, some embodiments may enable opt-in preferences to be shared among a designated set of endpoint devices and edge stations based on an identity, shared profile, workload configuration that may be container-specific, or a user profile that may be migrated between multiple endpoint devices or stations. For example, a user whose application workload is migrated to an edge station might wish for their opt-in preferences to transfer along with the workload. Similarly, when multiple users share the same edge station, those users may each want to transfer their individual opt-in preferences. Embodiments of the invention may enable both of those scenarios to occur.

Further, the interface that enables users to opt-in or out of additional network traffic monitoring may be extended to include the option to transfer the opt-in settings to any device that the workload is transferred to. In some instances, this may take the form of a profile that will travel with the workloads for that user. Embodiments of the invention may also enable users to opt-out of participation in additional monitoring, and/or out of workload transfers, based on the security settings of the remote device, and/or based on other settings such as network security settings, data transfer rates, or bandwidth. The opt-in preferences of multiple distinct users can be accommodated in the remote device, for example, by assigning the workload of each user to its own container.

F. Aspects of Some Example Use Cases, and Definitions

The following examples illustrate how some example implementations of this invention may behave, that is, example use cases. The first example concerns parallel editing of documents. Applications that enable multiple users to edit the same document in parallel may be implemented in connection with embodiments of this invention. For example, if a central datacenter is located in US, but a user from the UK and a user from China both need to edit the same document, the following scenario may be implemented by an embodiment of the invention:

1. The Tier-1 edge stations would be located at the users' locations, namely, the UK and China, possibly within the same network that the end-devices are located in.

2. If multiple edge stations are available across the globe, the scheduler may pick the optimal edge station based on network speed. In this case, the choice might be located in India.

3. The Tier-1 and Tier-2 containers may then be started at each of the edge stations and the document would be locked in the central datacenter, but replicated to each of these locations.

4. As the users are editing the document, data synchronization would occur at Tier-2 located in India.

5. The Tier-2 station would then synchronize the data back to the central datacenter located in US.

In this illustrative example, the network weights between the end-device, Tier-1, and Tier-2 may have a relatively higher importance, and the network speed between Tier-2 and the central datacenter may not be as important. After the initialization finishes, if another user needs to also edit the same document from Shanghai China, the same Tier-2 edge station can be used to serve all of Tier-1 edge stations. However, if a fourth user were to join from Brazil, then depending on the network speed, another tier of workload might need to be added to further aggregate the data, so that the user experiences between Europe and Asia can remain the same, but Brazil can also edit the same document with reasonable network speed and user experience.

Attention is directed briefly now to some definitions that may be employed in connection with various embodiments of the invention: edge station—one or more machines that offer compute and/or storage services; end device—the client of the service provided by edge stations, for example, smart phone, IoT devices, laptop, and tablet; edge station service providers—the organizations that set up edge stations as a service, which may include traditional cloud service providers, but could also include restaurants, transportation companies, and government, for example; cloud—a remote location to host workloads and data; tiers—the number of edge stations between the end device and the centralized cloud, which may include edge stations in the centralized cloud, or other central location.

G. Example Methods

Figure 4:
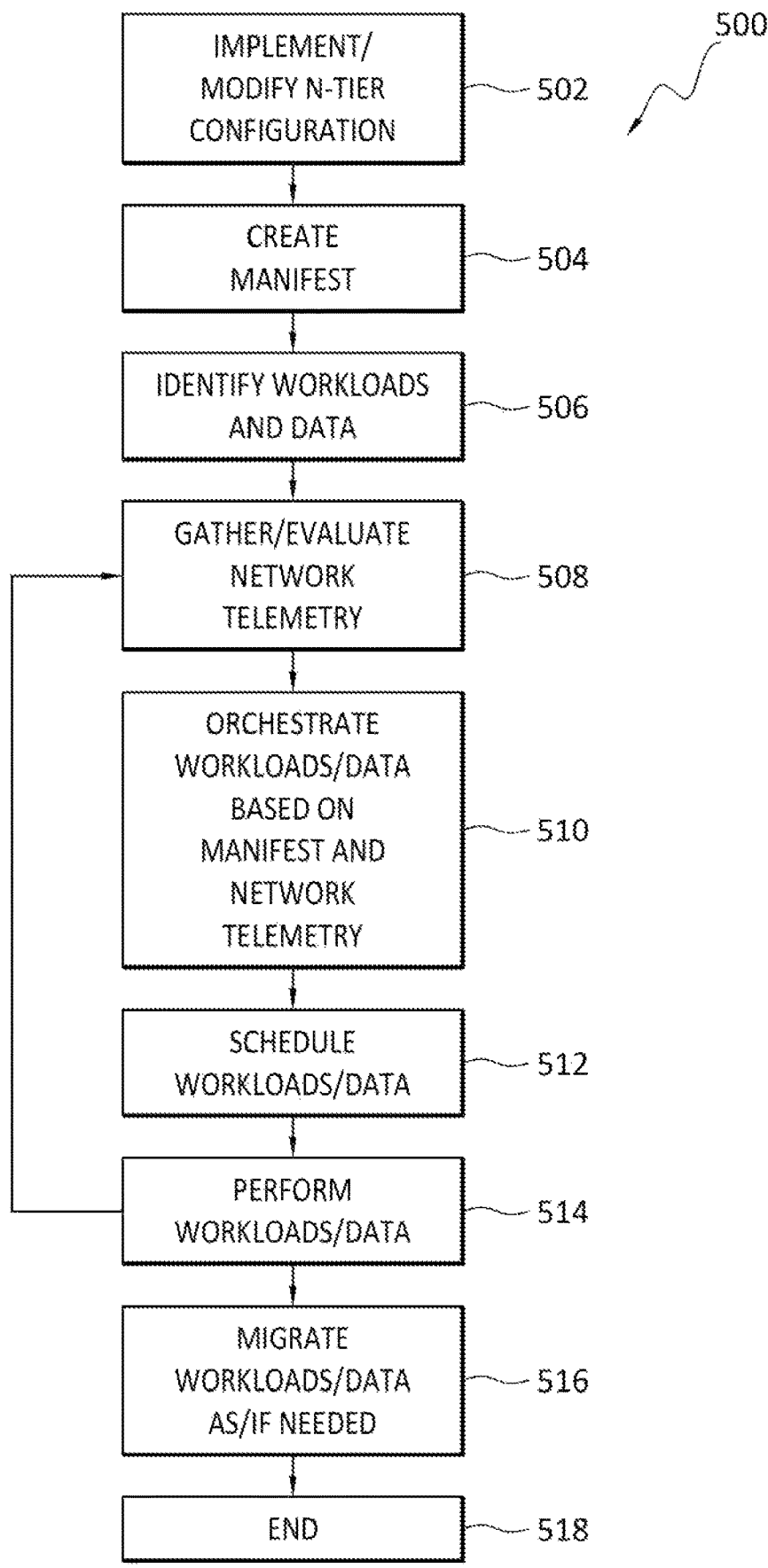
FIG. 4 discloses aspects of an example method.

With reference now to FIG. 4, details are provided concerning some example methods for workload and data placement and orchestration in an N-tier operating environment, where one example of such a method is denoted generally at 500. In some embodiments, the method 500 may be performed collectively by a group of entities, such as a developer application which may also be referred to herein as a 'custom-developed application,' an orchestrator, a scheduler, and a network monitoring component. However, no particular functional allocation is required, and the processes disclosed in FIG. 4 may be performed by the foregoing and/or other entities. Finally, while the processes indicated in FIG. 4 are shown as occurring in a particular order, it should be understood that the illustrated order is presented only by way of example, and not limitation. In other embodiments, the order of the processes in FIG. 4 may be different. To illustrate with one example, gathering/evaluation of the network telemetry may occur before a manifest is created. In general, any order of the processes in FIG. 4 which may be effective to implement one or more of the disclosed functionalities may be employed. Finally, one or more portions of the method 500 may be omitted in some circumstances. For example, telemetry collection and analytics may be omitted in some embodiments. Thus, the method 500 is presented only by way of example and is not intended to limit the scope of the invention in any way.

The method 500 may begin when an N-tier configuration is implemented, or an existing N-tier configuration is modified 502. Modification of an N-tier configuration may occur when, for example, evaluation of network telemetry indicates an unacceptable latency between one or more end devices, and one or more tiers of the existing N-tier configuration. Such modification, which may include addition of one or more tiers to an existing N-tier configuration, may help to reduce such latency to an acceptable level.

Next, a developer may generate a manifest 504 that relates to an application that has been developed, or may be under development or modification. The manifest may include, for example, a developer-defined startup strategy for containers associated with the application, developer-defined weights for network performance expectations, and developer-defined hardware requirements for execution of the containers and/or storage of application data. The manifest may be stored in any suitable location, such as a datacenter for example.

The workloads and/or data associated with the application may then be identified 506. The workload may comprise execution of one or more containers, and the data may comprise data generated, and/or expected to be generated, by the application. In some embodiments, the workloads and/or data may be packaged together, or otherwise associated, with the corresponding manifest so that, for example, in the event that a workload is migrated, the manifest will migrate with the workload.

Network telemetry may then be gathered and evaluated 508 to determine whether or not the network performance meets requirements specified in the manifest. If not, and as noted above, addition of one or more tiers to the N-tier configuration may be needed. Additionally, or alternatively, network systems, software, and/or hardware, may be adjusted or augmented as needed. Telemetry that includes PII may be encrypted or otherwise processed in such a way as to prevent unauthorized access to the PII while enabling access to network performance information.

Using the network telemetry and the manifest, the identified workloads and/or data may then be orchestrated 510 to one or more edge stations of one or more tiers of the N-tier configuration. Users and/or administrators may opt into, or out of, participation in the orchestration process 510. Orchestration 510 may be performed according to an orchestration plan generated by an orchestration component that receives, as inputs to generation of the orchestration plan, the network telemetry and manifest. The orchestration plan may identify the edge station(s) at which the workloads will be executed and/or application data stored, and orchestration may include positioning one or more containers at the edge station(s) to which the workload has been, or will be, assigned.

After the orchestration plan has been generated, a scheduling component may schedule 512 performance of the identified workloads and/or storage/transfer of application data that has been and/or will be generated by operation of the application and the end device(s). A schedule generated as part of 512 may be stored at a central location such as a datacenter and/or at the scheduling component, for example.

Based on the orchestration plan and the schedule, the identified workloads may then be performed, and/or application data stored, 514 at the edge station(s) identified in the orchestration plan. Before, during, and/or after, performance of the workload and/or storage of data 514, network telemetry data may continue to be gathered 508. In this way, if network performance should lag or otherwise become unacceptable during such performance 514, one or more of the workloads and/or data storage may be migrated 516 to one or more edge stations that are more suitable than the current edge station(s) to perform the workloads or implement data storage. As noted elsewhere herein, such migration may include transferring any associated manifests with the workload/data.

After the workloads have completed, the process 500 may end 518. At this point, the containers may be removed from the edge stations, and cached in some instances. As well, at 518, the data may be deleted from the edge stations.

H. Further Example Embodiments

Following are some further example embodiments of the invention. These are presented only by way of example and are not intended to limit the scope of the invention in any way.

Embodiment 1. A method, comprising: creating a manifest that specifies one or more requirements concerning execution of an application that resides at an end device in an N-tier configuration; identifying a workload that is associated with the application and executable at one or more edge stations of the N-tier configuration; gathering and evaluating network telemetry; orchestrating the workload based on the network telemetry and the manifest; scheduling performance of the workload at the one or more edge stations; and performing the workload at the one or more edge stations in accordance with the scheduling.

Embodiment 2. The method as recited in embodiment 1, wherein the manifest specifies a startup strategy concerning a group of containers that perform the workload, weights for network performance expectations, and hardware requirements associated with performance of the workload.

Embodiment 3. The method as recited in any of embodiments 1-2, wherein orchestrating the workload comprises defining an optimal placement of containers and data across N-tiers of the N-tier configuration.

Embodiment 4. The method as recited in embodiment 3, wherein the optimal placement is determined using IPv6 extension headers and/or flow labels of the IPv6 extension headers.

Embodiment 5. The method as recited in any of embodiments 1-4, further comprising receiving an opt in, or opt out, communication from a user indicating whether or not the user will participate in orchestrating the workload.

Embodiment 6. The method as recited in embodiment 5, further comprising sharing opt in, and/or opt out, information among a set of end devices and edge stations.

Embodiment 7. The method as recited in any of embodiments 1-6, further comprising protecting any personally identifiable information, included in the network telemetry, from unauthorized access.

Embodiment 8. The method as recited in any of embodiments 1-7, further comprising receiving additional network telemetry, and migrating the workload from the one or more edge stations based on the additional network telemetry.

Embodiment 9. The method as recited in any of embodiments 1-8, further comprising adding one or more tiers to the N-tier configuration based on the network telemetry.

Embodiment 10. The method as recited in any of embodiments 1-9, wherein orchestrating the workload comprises distributing containers associated with the application to one or more edge stations.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1-11.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
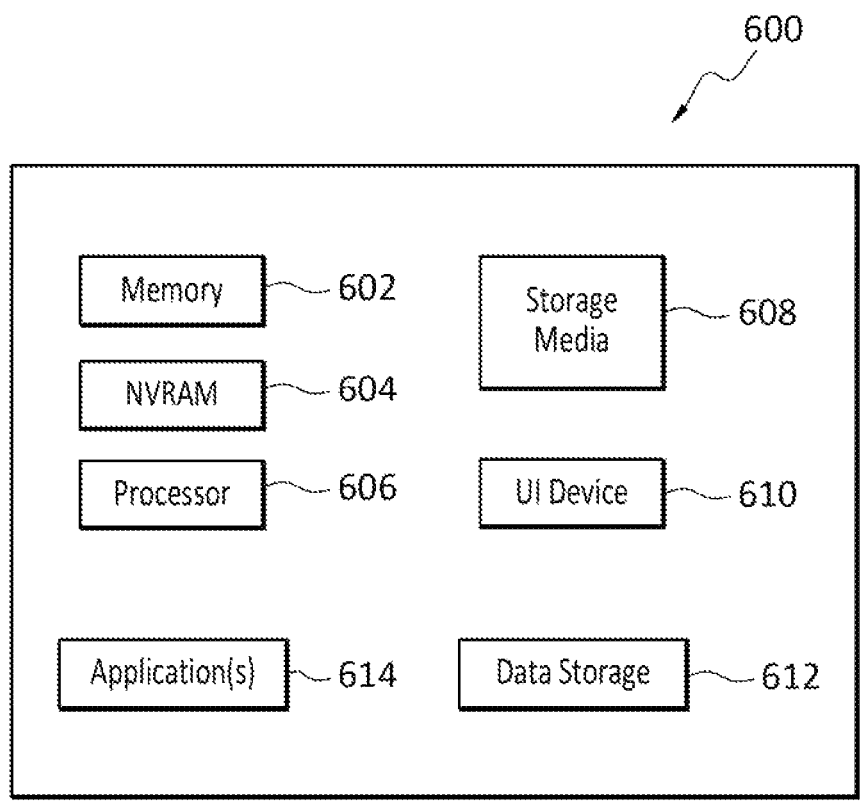
FIG. 5 discloses aspects of an example computing entity.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 5.

In the example of FIG. 5, the physical computing device 600 includes a memory 602 which may include one, some, or all, of random access memory (RAM), non-volatile memory (NVM) such as random access memory (NVRAM) 604, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, methods, processes, or portions of any of these, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
one or more hardware processors; and
a computer readable storage medium having stored therein instructions that are executable by the one or more hardware processors to perform operations comprising:
creating a manifest that specifies one or more requirements concerning a workload that is defined as execution of a group of containers associated with an application;
based on the requirements in the manifest, defining a tier topology of an N-tier configuration that includes multiple tiers;
gathering network telemetry and evaluating the network telemetry to determine if a system performance parameter, as indicated by the network telemetry, meets a specific one of the requirements specified in the manifest and, when the system performance parameter does not meet that specific requirement, modifying the number of tiers in the N-tier configuration;
orchestrating the workload across multiple tiers of the N-tier configuration, wherein the orchestrating is based on the network telemetry and the manifest and the orchestrating includes positioning each of the containers at one of the tiers of the N-tier configuration;
scheduling performance of the workload; and
performing the workload at one or more edge stations in accordance with the scheduling, wherein one of the edge stations is located on one tier of the N-tier configuration, and another of the edge stations is located on another tier of the N-tier configuration.

2. The system as recited in claim 1, wherein the manifest specifies a startup strategy concerning the group of containers, weights for network performance expectations, and hardware requirements associated with performance of the workload.

3. The system as recited in claim 1, wherein orchestrating the workload comprises defining an optimal placement of containers and data across multiple tiers of the N-tier configuration.

4. The system as recited in claim 3, wherein the optimal placement is determined using IPv6 extension headers and/or flow labels of the IPv6 extension headers.

5. The system as recited in claim 1, wherein the operations further comprise receiving an opt in, or opt out, communication from a user indicating whether or not the user will participate in orchestrating the workload.

6. The system as recited in claim 5, wherein the operations further comprise sharing opt in, and/or opt out, information among a set of end devices and edge stations.

7. The system as recited in claim 1, wherein the operations further comprise protecting any personally identifiable information, included in the network telemetry, from unauthorized access.

8. The system as recited in claim 1, wherein the operations further comprise receiving additional network telemetry, and migrating the workload from the one or more edge stations based on the additional network telemetry.

9. The system as recited in claim 1, wherein the particular number of tiers for which a container may be replicated is not specified in the manifest.

10. The system as recited in claim 1, wherein a number of tiers across which a container is to be replicated has a default value.

11. The system as recited in claim 1, wherein the manifest specifies a minimum and maximum number of tiers over which a given container is permitted to be replicated.

12. The system as recited in claim 1, wherein the tier topology includes only edge stations that meet a application requirements specified in the manifest.

13. The system as recited in claim 1, wherein the operations further comprise performing a discovery process to discover the one or more edge stations, and the tier topology includes the discovered edge stations.

14. The system as recited in claim 1, wherein the operations further comprise measuring, at runtime for the application, a network speed of each connection between edge stations and re-provisioning a session associated with the workload when the network speed falls below a defined threshold.

15. The system as recited in claim 1, wherein based on the manifest and network telemetry, a weighted shortest-path algorithm is used to orchestrate the workload data to co-locate with the workload.

16. The system as recited in claim 1, wherein the tier topology is based on any one or more of: a geographic basis in which a group of tiers comprises a tier corresponding to geographic regions of different respective sizes; a distance between a central point and one or more end devices, such that a relatively longer distance implies more tiers, while a relatively shorter distance implies fewer tiers; a particular minimum/maximum number of edge stations; an actual or expected latency between a central point and one or more end devices; and, aggregate data storage and/or processing power needed for the application or a group of applications.

\* \* \* \* \*